US009680378B2

(12) United States Patent
Nakamura

(10) Patent No.: US 9,680,378 B2
(45) Date of Patent: Jun. 13, 2017

(54) SWITCHING POWER-SUPPLY DEVICE

(71) Applicant: Sanken Electric Co., LTD., Niiza-shi, Saitama (JP)

(72) Inventor: Masaru Nakamura, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 46 days.

(21) Appl. No.: 14/838,919

(22) Filed: Aug. 28, 2015

(65) Prior Publication Data

US 2017/0063227 A1 Mar. 2, 2017

(51) Int. Cl.
*G05F 1/00* (2006.01)
*H02M 3/158* (2006.01)
*H02M 3/156* (2006.01)

(52) U.S. Cl.
CPC ........... *H02M 3/158* (2013.01); *H02M 3/156* (2013.01)

(58) Field of Classification Search
CPC ..... H02M 3/1584; H02M 3/156; H02M 3/157
USPC ........................................ 323/272, 282–285
See application file for complete search history.

(56) References Cited

U.S. PATENT DOCUMENTS

| 5,481,178 A | 1/1996 | Wilcox et al. | |
| 5,697,074 A * | 12/1997 | Makikallio | H03G 3/3047 330/141 |
| 2008/0136389 A1* | 6/2008 | Uchimoto | H02M 3/156 323/282 |
| 2012/0146599 A1* | 6/2012 | Oyama | H02M 3/1588 323/271 |
| 2014/0210444 A1* | 7/2014 | Nakamura | H02M 3/156 323/283 |

* cited by examiner

*Primary Examiner* — Nguyen Tran
(74) *Attorney, Agent, or Firm* — Banner & Witcoff, Ltd.

(57) ABSTRACT

A switching power-supply device that converts a first DC voltage into a second DC voltage and outputs the second DC voltage by turning on-and-off a switching element connected between the input power source and an inductor, includes: a drive unit, which drives the switching element based on a drive signal; a control unit, which performs intermittent oscillation control; and an error signal generator, which generates an error signal based on an error between a voltage corresponding to the second DC voltage and a reference voltage, wherein the control unit controls a timing, at which the turning-on of the switching element is permitted in the intermittent oscillation control, based on a signal indicating a comparison result between the error signal and a threshold value and an OFF time of the switching element based on the drive signal.

8 Claims, 11 Drawing Sheets

US 9,680,378 B2

SWITCHING POWER-SUPPLY DEVICE

TECHNICAL FIELD

This disclosure relates to a switching power-supply device.

BACKGROUND ART

As a method of generating a stable voltage lower than an input voltage, a non-insulated step-down chopper circuit is widely used. In the step-down chopper circuit, since a switching operation is continuously performed even in a light-load state such as in a waiting time, power conversion efficiency is lowered as the load becomes lighter.

U.S. Pat. No. 5,481,178 discloses a switching power-supply device which detects a light-load state from an error signal generated by comparing an output voltage and a reference voltage and transitions to intermittent oscillation control, in which a period where driving of a switching element is permitted and a period where driving of the switching element is prohibited are alternately repeated in the light-load state.

In this switching power-supply device, by lowering a switching frequency of the switching element as an output current decreases in the intermittent oscillation control, a switching loss and a drive current of the switching element are decreased and thus the efficiency in the light-load state is improved.

SUMMARY

In this switching power-supply device, since the switching frequency in the intermittent oscillation control is lowered without limitation as the output current decreases, the switching power-supply device operates in a human audible frequency band (generally equal to or lower than 16 kHz).

Accordingly, when a ceramic capacitor is used as an output capacitor, ringing sound is generated from the ceramic capacitor due to the intermittent oscillation operation in the audible frequency band. As a countermeasure, a ceramic capacitor in which ringing sound is suppressed by designing a shape is issued, but has a demerit that costs thereof are high.

This disclosure is made in consideration of the above-mentioned circumstances and is to provide a switching power-supply device that is possible to prevent ringing sound from being generated from a capacitor with low costs even when an output current decreases in intermittent oscillation control.

A switching power-supply device of this disclosure converts a first DC voltage supplied from an input power source into a second DC voltage and outputs the second DC voltage by turning on-and-off a switching element connected between the input power source and an inductor. The switching power-supply device includes a drive unit, which drives the switching element based on a drive signal; a control unit, which performs intermittent oscillation control of alternately repeating a period where the turning-on of the switching element by the drive unit is prohibited and a period where the turning-on of the switching element by the drive unit is permitted; and an error signal generator, which generates an error signal based on an error between a voltage corresponding to the second DC voltage and a reference voltage, wherein the control unit controls a timing, at which the turning-on of the switching element is permitted in the intermittent oscillation control, based on a signal indicating a comparison result between the error signal and a threshold value and an OFF time of the switching element based on the drive signal.

According to this disclosure, it is possible to provide a switching power-supply device that is possible to prevent ringing sound from being generated from a capacitor with low costs even when an output current decreases in intermittent oscillation control.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an embodiment of this disclosure will be described with reference to the accompanying drawings.

Figure 1:
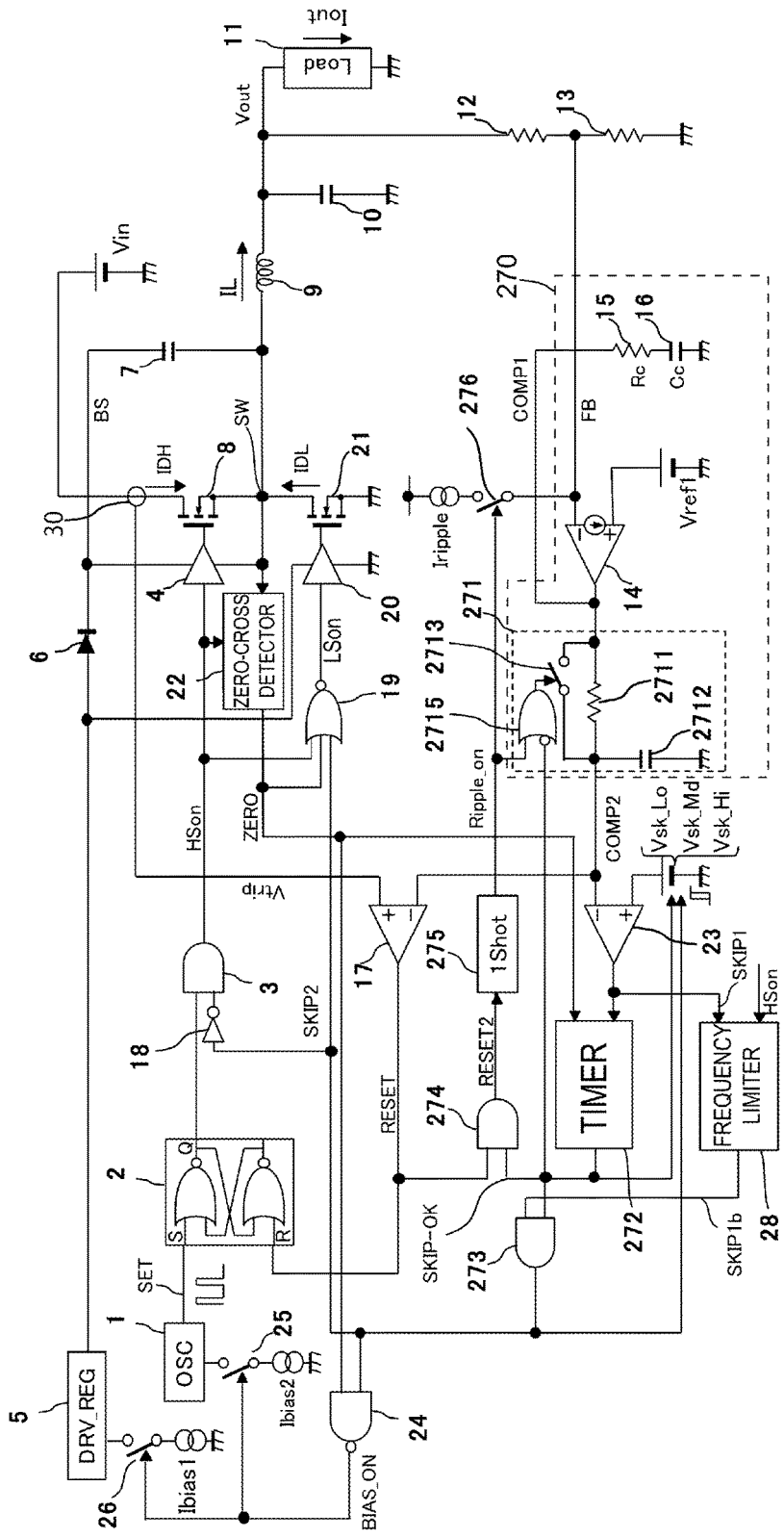
FIG. 1 is a circuit diagram schematically illustrating a configuration of a switching power-supply device according to an embodiment of this disclosure.

FIG. 1 is a circuit diagram schematically illustrating a configuration of a switching power-supply device according to an embodiment of this disclosure.

The switching power-supply device illustrated in FIG. 1 includes a high-side MOSFET 8 and a low-side MOSFET 21 as switching elements which are connected to an input power source Vin supplying a first DC voltage, an inductor 9 which is connected to the high-side MOSFET 8 and the low-side MOSFET 21, and an output capacitor 10, and converts the first DC voltage into an output voltage Vout as a second DC voltage and outputs the output voltage to a load circuit 11 by alternately turning on and off the high-side MOSFET 8 and the low-side MOSFET 21.

The drain of the high-side MOSFET 8 is connected to the input power source Vin, the source of the high-side MOSFET 8 is connected to the drain of the low-side MOSFET 21. The source of the low-side MOSFET 21 is connected to a ground terminal. A connection point of the high-side MOSFET 8 and the low-side MOSFET 21 is defined as a SW terminal.

The inductor 9 is connected between the SW terminal and the load circuit 11.

The output capacitor 10 is connected between a connection point of the inductor 9 and the load circuit 11 and the ground terminal. For example, a low-cost ceramic capacitor is used as the output capacitor 10.

The switching power-supply device illustrated in FIG. 1 additionally includes a current detection circuit 30 that detects a drain current IDH flowing in the high-side MOSFET 8 and outputs a current signal Vtrip which is a voltage signal corresponding to the detected current, a zero-cross detection circuit (ZERO) 22, a high-side driver 4 as a drive unit driving the high-side MOSFET 8, a low-side driver 20 as a drive unit driving the low-side MOSFET 21, a backflow prevention diode 6 and a bootstrap capacitor 7 that supply a source voltage to the high-side driver 4, a regulator circuit 5 that generates a source voltage for driving the high-side driver 4 and the low-side driver 20, a switch 26 that is connected to the regulator circuit 5, a drive signal generator (an oscillator 1, an SR flip-flop 2, a first AND circuit 3, a PWM comparator 17, an inverter 18, and a NOR circuit 19) that generates a drive signal supplied to the high-side driver 4 and the low-side driver 20, a switch 25 that is connected to the oscillator 1, a NAND circuit 24 that controls switching of the switch 25 and the switch 26, a feedback resistor 12 and a feedback resistor 13 that detect an output voltage Vout and output a feedback voltage FB corresponding to the detected voltage, and an error signal generator 270 that generates an error signal COMP2 based on an error between the feedback voltage FB and a reference voltage Vref1.

The switches described in this embodiment are turned on when a signal for controlling the switching thereof is at a high level (High) and are turned off when the signal for controlling the switching is at a low level (Low).

The high-side driver 4 controls the gate voltage of the high-side MOSFET 8 based on a drive signal HSon supplied from the first AND circuit 3 of the drive signal generator. The high-side driver 4 turns on the high-side MOSFET 8 in a period where the drive signal HSon is at High and turns off the high-side MOSFET 8 in a period where the drive signal HSon is at Low.

The power supply terminal of the high-side driver 4 is connected to the bootstrap capacitor 7, and a source voltage is supplied to the high-side driver 4 from the bootstrap capacitor 7.

The bootstrap capacitor 7 is connected to the regulator circuit 5 via the backflow prevention diode 6.

The low-side driver 20 controls the gate voltage of the low-side MOSFET 21 based on a drive signal LSon supplied from the NOR circuit 19 of the drive signal generator. The low-side driver 20 turns on the low-side MOSFET 21 in a period where the drive signal LSon is at High and turns off the low-side MOSFET 21 in a period where the drive signal LSon is at Low.

The regulator circuit 5 operates with a bias current Ibias1 supplied from a bias current source connected thereto via the switch 26.

The regulator circuit 5 generates a source voltage of the high-side driver 4 by charging the bootstrap capacitor 7 via the backflow prevention diode 6 when the high-side MOSFET 8 is turned off and the low-side MOSFET 21 is turned on. The regulator circuit 5 is also connected to the power supply terminal of the low-side driver 20 and supplies the source voltage to the low-side driver 20.

The zero-cross detection circuit 22 detects whether a regeneration period of the inductor 9 has terminated based on the drive signal HSon and the voltage signal of the SW terminal and outputs a zero-cross signal ZERO. The zero-cross detection circuit 22 changes the zero-cross signal ZERO to High when it is detected that the regeneration period of the inductor 9 is terminated.

The termination of regeneration of the inductor 9 means that energy accumulated in the inductor 9 in a state where the high-side MOSFET 8 is in the ON state is discharged from the inductor 9 after the high-side MOSFET 8 is turned off and the low-side MOSFET 21 is turned on, and thus discharging is completed.

Figure 2:
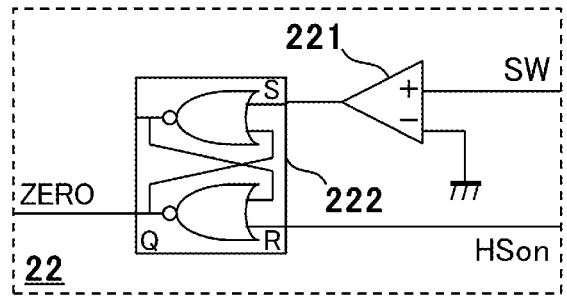
FIG. 2 is a circuit diagram illustrating an internal configuration example of a zero-cross detection circuit.

FIG. 2 is a circuit diagram illustrating an internal configuration example of the zero-cross detection circuit 22. The zero-cross detection circuit 22 includes a comparator 221 that compares a ground level with the voltage signal of the SW terminal and an SR flip-flop 222 in which the drive signal HSon is input to a reset terminal R thereof, and the output signal of the comparator 221 is input to a set terminal S thereof.

According to the circuit configuration illustrated in FIG. 2, when the voltage signal of the SW terminal reaches the ground level in a state where the drive signal HSon is at Low, the zero-cross signal ZERO is changed to High.

The oscillator 1 operates with a bias current Ibias2 supplied from the bias current source connected thereto via the switch 25. The oscillator 1 generates a pulse signal of a predetermined frequency.

The pulse signal generated from the oscillator 1 is input to the set terminal S of the SR flip-flop 2. A signal RESET output from the PWM comparator 17 is input to the reset terminal R of the SR flip-flop 2.

The current signal Vtrip output from the current detection circuit 30 is input to a plus input terminal of the PWM comparator 17. An error signal COMP2 is input to a minus input terminal of the PWM comparator 17.

The PWM comparator 17 changes the signal RESET to High when the current signal Vtrip reaches the error signal COMP2, and changes the signal RESET to Low in a state where the current signal Vtrip is less than the error signal COMP2. The ON widths of the high-side MOSFET 8 and the low-side MOSFET 21 are controlled by the PWM comparator 17.

The first AND circuit 3 is input with the signal output from an output terminal Q of the SR flip-flop 2 and the signal output from the inverter 18 and outputs the drive signal HSon.

A signal SKIP2 output from a second AND circuit 273 to be described later is input to the inverter 18.

The NOR circuit 19 is input with the drive signal HSon output from the first AND circuit 3, the zero-cross signal ZERO output from the zero-cross detection circuit 22, and the signal SKIP2 output from the second AND circuit 273 to be described later and outputs the drive signal LSon.

The NAND circuit 24 is input with the zero-cross signal ZERO output from the zero-cross detection circuit 22 and the signal SKIP2 output from the second AND circuit 273 to be described later, outputs a BIAS_ON signal, and controls the switching of the switch 25 and the switch 26 by using the BIAS_ON signal.

The NAND circuit 24, the switch 25, and the switch 26 configure a drive stopping unit that stops the oscillator 1 and the regulator circuit 5 in a period (a period where the signal SKIP2 is at High) where the turning-on of the high-side MOSFET 8 and the low-side MOSFET 21 is prohibited in the intermittent oscillation control and a period (a period where the zero-cross signal ZERO is at High) where the zero-cross detection circuit 22 detects that the regeneration period of the inductor 9 has terminated. One of the switch 25 and the switch 26 may be used and the other may be omitted.

The feedback resistor 12 and the feedback resistor 13 are connected in series between the connection point of the inductor 9 and the load circuit 11 and the ground terminal.

The error signal generating unit 270 includes: an error amplifier 14 as the error amplifier that amplifies an error between the feedback voltage FB which is a voltage corresponding to the output voltage Vout and the reference voltage Vref1 and then outputs an error amplification signal COMP1; a phase-compensating resistor 15; a phase-compensating capacitor 16; and a filter circuit 271 that attenuates the error amplification signal COMP1 output from the error amplifier 14 with a variable time constant and then outputs the attenuated error amplification signal as an error signal COMP2.

A minus input terminal of the error amplifier 14 is connected to the connection point of the feedback resistor 12 and the feedback resistor 13 and a plus input terminal of the error amplifier 14 is connected to the power source supplying the reference voltage Vref1. A series circuit of the phase-compensating resistor 15 and the phase-compensating capacitor 16 is connected between the output terminal of the error amplifier 14 and the ground terminal.

The filter circuit 271 includes a filter resistor 2711 that is connected to the output terminal of the error amplifier 14, a filter capacitor 2712 that is connected between the filter resistor 2711 and the ground terminal, a time constant adjustment switch 2713 that is connected to both ends of the filter resistor 2711, and an OR circuit 2715 that controls switching of the time constant adjustment switch 2713.

The filter circuit 271 attenuates the error amplification signal COMP1 with a time constant which is determined by the resistance value of the filter resistor 2711 and the capacitance value of the filter capacitor 2712.

In the state where the time constant adjustment switch 2713 is in the OFF state, the time constant increases. Accordingly, the attenuation characteristics are strengthened and the filter circuit 271 outputs an error signal COMP2 which is obtained by greatly attenuating the error amplification signal COMM. In the state where the time constant adjustment switch 2713 is in the ON state, the time constant decreases. Accordingly, the attenuation characteristics are weakened and the filter circuit 271 outputs the error signal COMP2 which is substantially equal to the error amplification signal COMP1.

The switching power-supply device illustrated in FIG. 1 further includes: a light-load detection comparator 23 as a comparator that compares the error signal COMP2 with a variable threshold value and outputs a signal SKIP1 indicating the comparison result; a lower frequency limiter (FLIM) 28, a timer circuit 272, a second AND circuit 273, a third AND circuit 274, a one-shot circuit 275, a voltage-superimposing switch 276, and a current source Iripple.

In the light-load detection comparator 23, the error signal COMP2 is input to a minus input terminal thereof and a variable threshold value is input to a plus input terminal thereof from the power source. In this embodiment, the variable threshold value is possible to be set to three steps of Vsk_Lo, Vsk_Md, and Vsk_Hi and a relationship of Vsk_Lo<Vsk_Md<Vsk_Hi is established.

When a signal (the zero-cross signal ZERO of High), indicating that the regeneration period of the inductor 9 has terminated is output from the zero-cross detection circuit 22 and a signal (the signal SKIP1 of High) indicating that the error signal COMP2 is less than the threshold value Vsk_Lo is output from the light-load detection comparator 23, the timer circuit 272 permits the intermittent oscillation control by changing the signal SKIP-OK to High after a first predetermined time elapses. After that, the timer circuit 272 prohibits the intermittent oscillation control by changing the signal SKIP-OK to Low when a time in which the signal indicating that the regeneration period of the inductor 9 has terminated is not output from the zero-cross detection circuit 22 reaches a second predetermined time.

Figure 3:
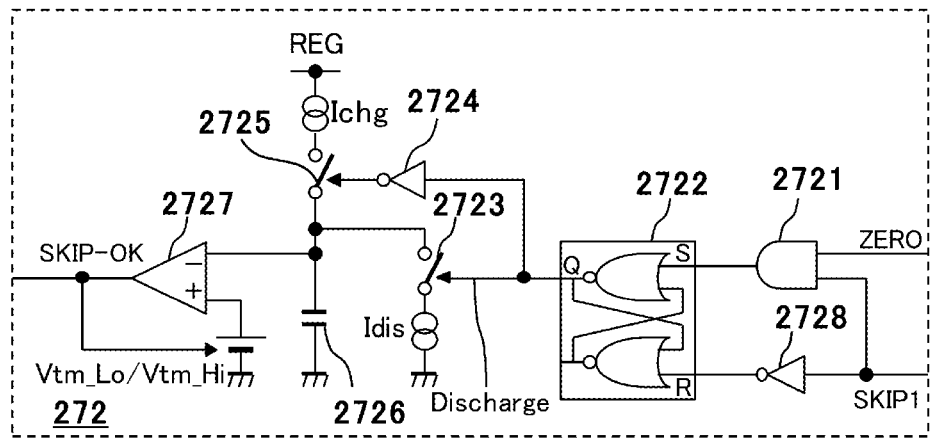
FIG. 3 is a circuit diagram illustrating an internal configuration example of a timer circuit.

FIG. 3 is a circuit diagram illustrating an internal configuration example of the timer circuit 272.

The timer circuit 272 includes: an AND circuit 2721 to which the zero-cross signal ZERO and the signal SKIP1 are input; an inverter 2728 to which the signal SKIP1 is input; an SR flip-flop 2722 in which the output signal of the AND signal 2721 is input to the set terminal S thereof and the output signal of the inverter 2728 is input to a reset terminal R thereof; an inverter 2724 to which the output signal Discharge of the SR flip-flop 2722 is input; a capacitor 2726 which is grounded; a current source Ichg which is connected to the regulator circuit 5; a switch 2725 that is disposed between the capacitor 2726 and the current source Ichg and of which the switching is controlled by the output signal of the inverter 2724; a current source Idis; a switch 2723 that is disposed between a connection point of the switch 2725 and the capacitor 2726 and of which the switching is controlled by the output signal Discharge; and a comparator 2727 in which the voltage of the capacitor 2726 is input to a minus input terminal thereof and the variable threshold voltage of two steps are input to a plus input terminal thereof.

The variable threshold voltage of two steps are Vtm_Lo and Vtm_Hi and a relationship of Vtm_Lo<Vtm_Hi is established.

The signal SKIP-OK is input to the second AND circuit 273, the third AND circuit 274, the inverted input terminal of the OR circuit 2715 configuring the filter circuit 271, and the power source connected to the plus input terminal of the light-load detection comparator 23.

The lower frequency limiter 28 serves as a control unit that performs intermittent oscillation control of alternately repeating a period where the turning-on of the high-side MOSFET 8 and the low-side MOSFET 21 by the high-side driver 4 and the low-side driver 20 is prohibited and a period where the turning-on of the high-side MOSFET 8 and the low-side MOSFET 21 by the high-side driver 4 and the low-side driver 20 is permitted.

Specifically, the lower frequency limiter 28 outputs a signal SKIP1*b* for controlling the timing at which the turning-on of the high-side MOSFET 8 in the intermittent oscillation control is permitted based on the signal SKIP1 output from the light-load detection comparator 23 and the OFF time of the high-side MOSFET 8 based on the drive signal HSon. The lower frequency limiter 28 performs the intermittent oscillation control in response to the signal SKIP1*b*.

Figure 4:
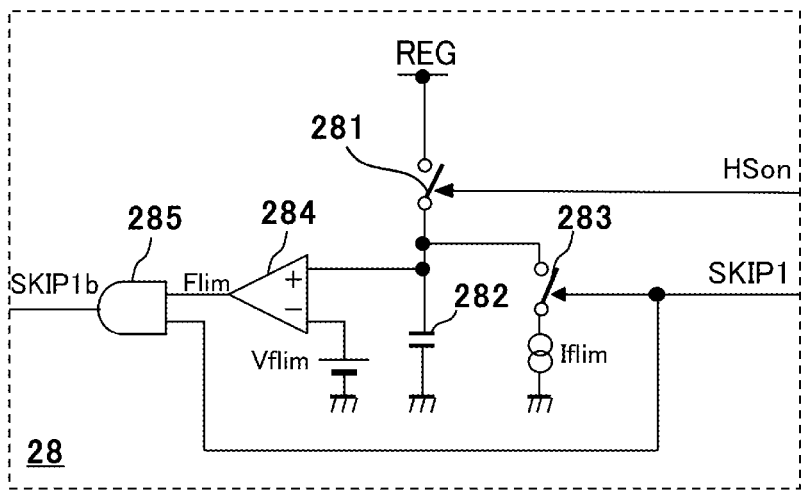
FIG. 4 is a circuit diagram illustrating an internal configuration example of a lower frequency limiter.

FIG. 4 is a circuit diagram illustrating an internal configuration example of the lower frequency limiter 28.

The lower frequency limiter 28 includes: a capacitor 282 which is grounded; a switch 281 that is disposed between the capacitor 282 and the regulator circuit 5 and of which the switching is controlled by the drive signal HSon; a current source Iflim; a switch 283 that is disposed between a connection point of the switch 281; and the capacitor 282 and the current source Iflim and of which the switching is controlled by the signal SKIP1 output from the light-load detection comparator 23; a comparator 284 in which the voltage of the capacitor 282 is input to a plus input terminal thereof and a reference voltage Vflim is input to a minus input terminal thereof; and an AND circuit 285 that is input with the output signal Flim of the comparator 284 and the signal SKIP1 and that outputs the signal SKIP1b.

In the state where the switch 281 is in the ON state, the capacitor 282 is charged by the regulator circuit 5. The reference voltage Vflim is set to a value lower than the voltage of the capacitor 282 in the state where the capacitor 282 is charged by the regulator circuit 5. In the state where the switch 283 is in the ON state, the capacitor 282 is discharged by the current source Iflim.

The comparator 284 changes the signal Flim to Low only when the voltage of the capacitor 282 reaches the reference voltage Vflim and retains the signal Flim to High when the condition is not satisfied.

The second AND circuit 273 is input with the signal SKIP1b output from the lower frequency limiter 28 and the signal SKIP-OK output from the timer circuit 272 and outputs the signal SKIP2. The signal SKIP2 is input to the NAND circuit 24, the inverter 18, the NOR circuit 19, and the plus input terminal of the light-load detection comparator 23.

The power source which is connected to the light-load detection comparator 23 so as to supply a variable threshold value controls the threshold voltage supplied to the light-load detection comparator 23 based on the signal SKIP-OK output from the timer circuit 272 and the signal SKIP2 output from the second AND circuit 273.

Specifically, the power source sets the threshold value to Vsk_Hi in synchronization with the rising of the signal SKIP-OK and sets the threshold value to Vsk_Lo in synchronization with the falling of the signal SKIP-OK. In the period where the signal SKIP-OK is at High, the power source sets the threshold value to Vsk_Md in synchronization with the falling of the signal SKIP2 and sets the threshold value to Vsk_Hi in synchronization with the rising of the signal SKIP2.

The light-load detection comparator 23 sets the signal SKIP1 to High when the error signal COMP2 reaches Vsk_Lo, then sets the signal SKIP1 to Low when the error signal COMP2 reaches Vsk_Hi, and sets the signal SKIP1 to High when the error signal COMP2 reaches Vsk_Md in the period where the signal SKIP1 is at Low.

In the state where the intermittent oscillation control is performed, the switching frequency of the high-side MOSFET 8 and the low-side MOSFET 21 is lowered with the decrease of the output current Iout. The lowering of the switching frequency in the intermittent oscillation control means that the time until the switch 281 illustrated in FIG. 4 is turned on in the next time after the switch 281 is turned on is extended.

In the circuit illustrated in FIG. 4, the reference voltage Vflim and the capacitance and the discharge characteristics of the capacitor 282 are designed such that the voltage of the capacitor 282 becomes equal to or less than the reference voltage Vflim and the signal Flim becomes the low level when the time (that is, the OFF period of the high-side MOSFET 8) until the switch 281 is turned on in the next time after the switch 281 is turned on becomes a certain time threshold value.

In other words, the reference voltage Vflim and the capacitance and the discharge characteristics of the capacitor 282 are designed such that the time required to discharge the voltage of the capacitor 282 charged in the period where the drive signal HSon is at High to become the reference voltage Vflim by the current source Iflim reaches the time threshold value.

When the signal Flim is changed to Low, the signal SKIP1b is changed to Low, and then the output of the second AND circuit 273 is changed to Low and the output of the inverter 18 is changed to High. That is, the switching control of the high-side MOSFET 8 and the low-side MOSFET 21 is permitted.

A frequency converted value obtained by the reciprocal of the time threshold value is set to an arbitrary frequency which is higher than the upper limit (about 16 kHz or less) of the human audible frequency band. Accordingly, the frequency limit is controlled such that the lowest switching frequency (lower-limit frequency) of the high-side MOSFET 8 and the low-side MOSFET 21 in the intermittent oscillation control reaches the arbitrary frequency.

The third AND circuit 274 is input with the signal RESET output from the PWM comparator 17 and the signal SKIP-OK output from the timer circuit 272 and outputs a signal RESET2 to the one-shot circuit 275.

The one-short circuit 275 outputs a signal Ripple_ON which is at High for a predetermined time, when the signal RESET2 output from the third AND circuit 274 is changed to High. The signal Ripple_ON is input to the voltage-superimposing switch 276 and the noninverted input terminal of the OR circuit 2715 of the filter circuit 271.

The voltage-superimposing switch 276 is disposed between the current source Iripple and the minus input terminal of the error amplifier 14 and the switching thereof is controlled by the signal Ripple_ON.

When the drive signal for switching the high-side MOSFET 8 from the ON state to the OFF state in the intermittent oscillation control permission period where the signal SKIP-OK is at High (the signal RESET is changed to High), the third AND circuit 274, the one-short circuit 275, and the voltage-superimposing switch 276 serve as a voltage-superimposing circuit that superimposes a voltage signal on the input terminal of the error amplifier 14 for a predetermined time.

The operation of the switching power-supply device illustrated in FIG. 1 will be described below.

Figure 5:
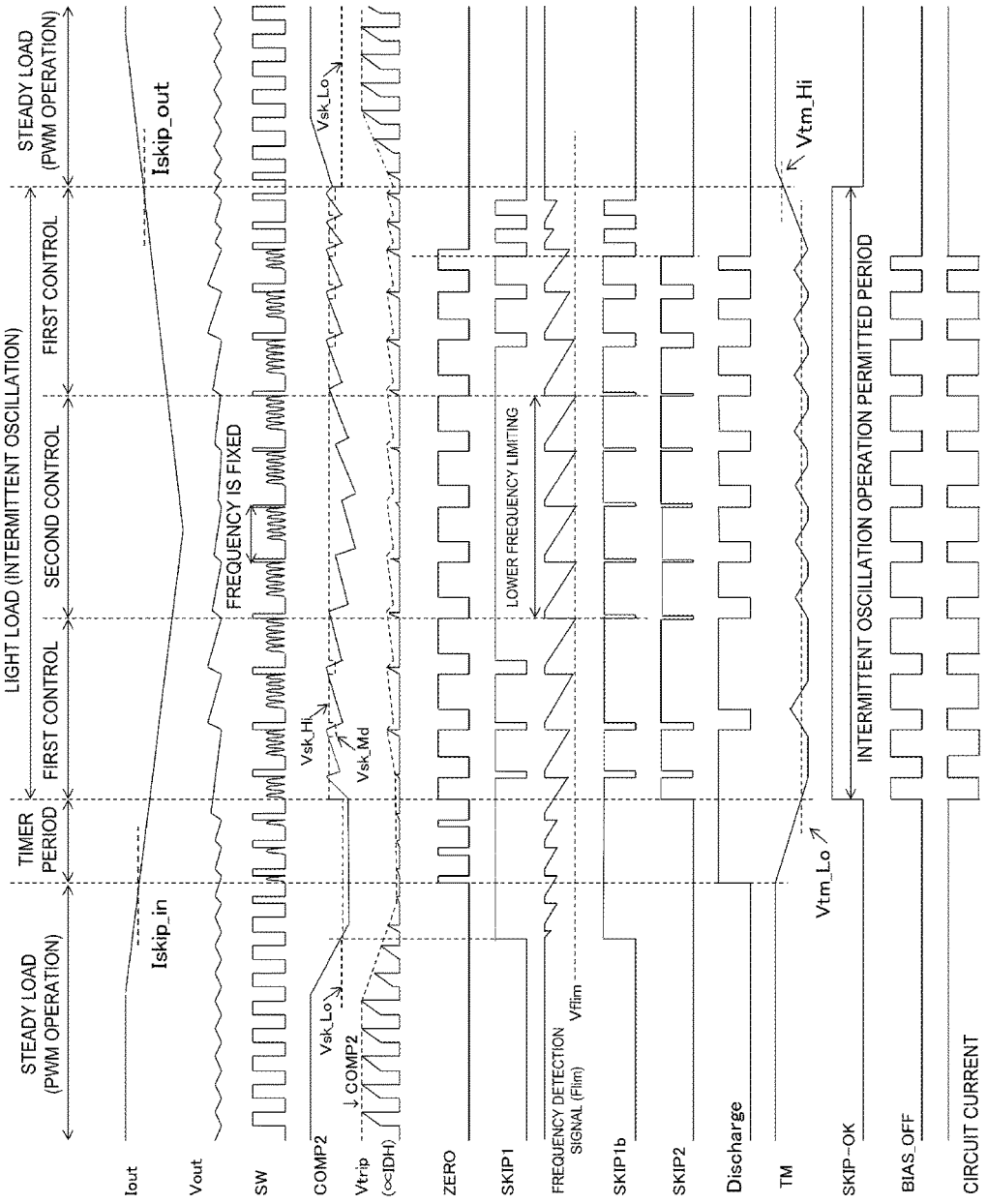
FIG. 5 is a timing chart illustrating the operation of the switching power-supply device illustrated in FIG. 1.
Figure 6:
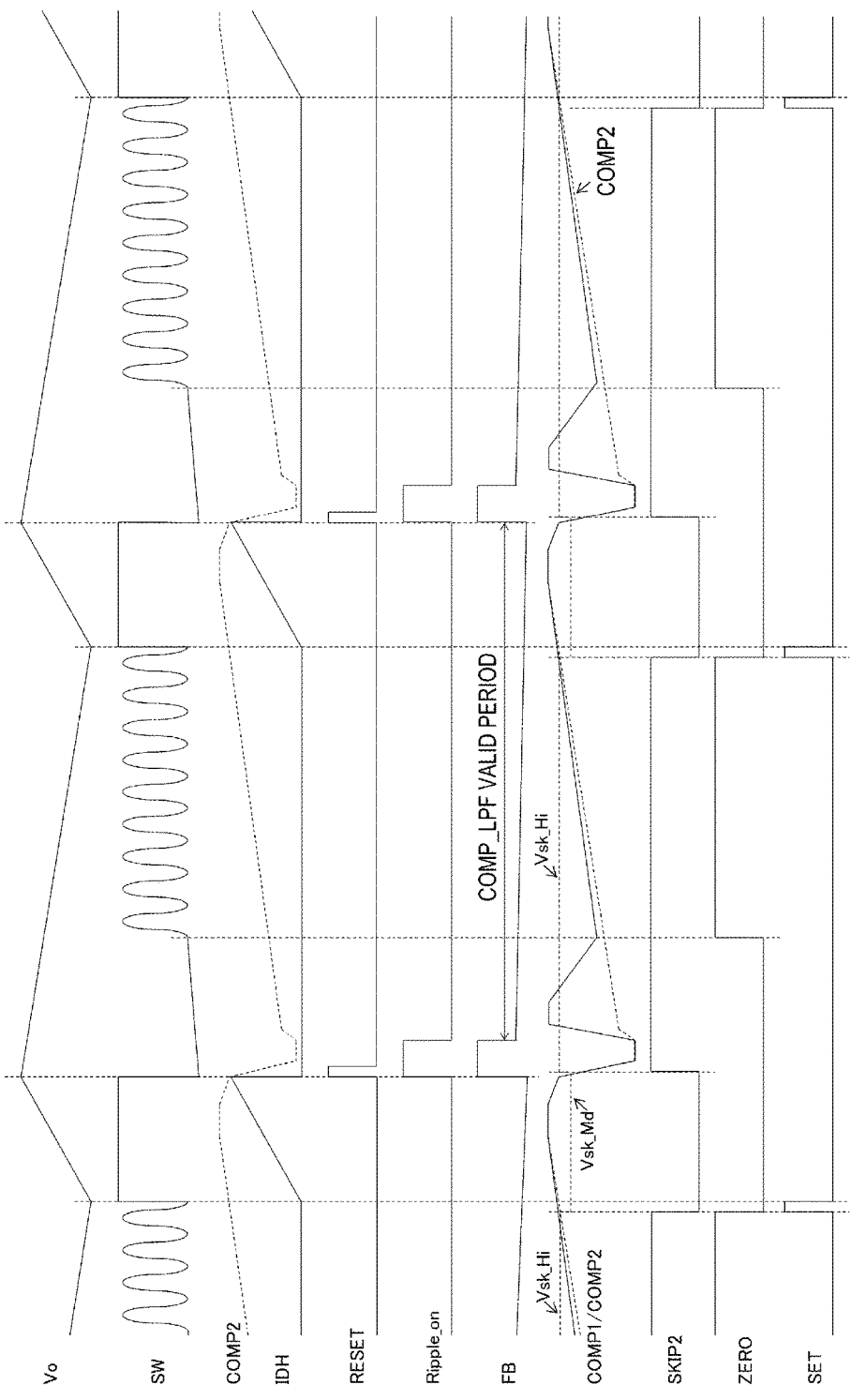
FIG. 6 is a timing chart illustrating the operation of the switching power-supply device illustrated in FIG. 1.

FIGS. 5 and 6 are timing charts illustrating the operation of the switching power-supply device illustrated in FIG. 1. In FIGS. 5 and 6, "SW" denotes the voltage signal of the SW terminal. "TM" in FIG. 5 denotes the voltage of the capacitor 2726 illustrated in FIG. 3. "BIAS_OFF" in FIG. 5 denotes the period where the switch 25 and the switch 26 are turned off. "SET" in FIG. 6 denotes the signal input to the set terminal S of the RS flip-flop 2 from the oscillator 1.

First, the operation in an area of (Iout>Iskip_in) in a steady load state will be described.

In the steady load state, the switch 273 is turned off, the attenuation characteristics of the filter circuit 271 are weakened, and the error signal COMP2 which is substantially equal to the error amplification signal COMP1 is output from the filter circuit 271. The error signal COMP2 is input to the inverted input terminal of the PWM comparator 17 and the inverted input terminal of the light-load detection comparator 23.

When the threshold value Vsk_Lo is input to the noninverted input terminal of the light-load detection comparator 23 and the output current Iout is sufficiently high, COMP2>Vsk_Lo is established and thus the signal SKIP1 output from the light-load detection comparator 23 is changed to Low. Accordingly, the signal SKIP2 of Low is output to the input terminals of the inverter 18, the NOR circuit 19, and the NAND circuit 24 via the second AND circuit 273. Accordingly, the intermittent oscillation operation is prohibited.

The oscillator 1 generates a setting pulse SET based on the constant current Ibias2 and outputs the setting pulse SET to the set terminal S of the SR flip-flop 2. The regulator circuit 5 supplies the drive voltage to the low-side driver 20 and the high-side driver 4.

When the SR flip-flop 2 is in the set state, the high-side MOSFET 8 is turned on by driving the high-side driver 4 via the first AND circuit 3. At this time, the SW terminal voltage increases up to a voltage close to the input voltage Vin and the drain current IDH corresponding to the voltage difference between the SW terminal and the Vout terminal flows in the inductor 9, whereby energy is supplied to the output capacitor 10 and the load circuit 11.

On the other hand, when the current signal Vtrip is greater than the error signal COMP2 in the period where the high-side MOSFET 8 is turned on, the signal RESET of High is input to the reset terminal R of the SR flip-flop 2. Accordingly, when the SR flip-flop 2 becomes the reset state, the high-side driver 4 is turned off via the first AND circuit 3 and the low-side driver 20 is turned on via the NOR circuit 19.

By switching the high-side MOSFET 8 from the ON state to the OFF state and switching the low-side MOSFET 21 from the OFF state to the ON state, a regeneration current IDL is supplied from the source of the low-side MOSFET 21 to the inductor 9 via the drain thereof.

In a current-continuity operation in which the regeneration of the inductor 9 is not terminated in an oscillation period determined in the oscillator 1, the SR flip-flop 2 is set again, the low-side MOSFET 21 is turned off, and the high-side MOSFET 8 is turned on.

By repeating the above-mentioned series of operations, a step-down chopper operation is performed.

The operation of transitioning from the steady load state to the light load state (Iout=Iskip_in) will be described below.

When the output current Iout decreases, the error amplification signal COMP1 and the error signal COMP2 decrease and thus the peak value of the drain current IDH of the high-side MOSFET 8 is controlled to decrease.

In the light-load detection comparator 23, the error signal COMP2 and the threshold value Vsk_Lo are compared with each other and the signal SKIP1 is switched from Low to High when the error signal COMP2 is equal to or less than the threshold value Vsk_Lo.

Thereafter, when the output current Tout further decreases and the valley current of the inductor current IL reaches zero, a current-discontinuity operation is performed. At this time, the polarity of the SW terminal voltage is switched from minus to plus. The zero-cross detection circuit 22 detects the switching of the polarity of the SW terminal voltage by using the comparator 221 and sets the SR flip-flop 222 to the set state. Accordingly, the low-side MOSFET 21 is turned off by the NOR circuit 19 and the low-side driver 20 and the zero-cross signal ZERO of a high level indicating a zero-cross detection state is input to the timer circuit 272.

In the timer circuit 272, when the signal SKIP1 and the zero-cross signal ZERO becomes High, the SR flip-flop 2722 becomes the set state via the AND circuit 2721 and the switch 2723 is turned on. Then, the switch 2725 is turned off via the inverter 2724 and thus the capacitor 2726 is discharged by the constant current Idis.

The comparator 2727 compares the voltage of the capacitor 2726 with the threshold value Vtm_Lo, and switches the signal SKIP-OK from Low to High and switches the threshold value Vtm_Lo to the threshold value Vtm_Hi when the voltage of the capacitor 2726 reaches the threshold value Vtm_Lo. Accordingly, the operation mode is switched to a mode in which the intermittent oscillation operation is permitted.

With the rising of the signal SKIP-OK output from the comparator 2727, the threshold value of the light-load detection comparator 23 is switched from the threshold value Vsk_Lo to the threshold value Vsk_Hi.

The operation in a first control period (No load<<Iout<Iskip_in) of the intermittent oscillation with a light load will be described below.

In the state where the signal SKIP-OK is at High and the intermittent oscillation control is permitted, the second AND circuit 273 forcibly turns off the high-side MOSFET 8 via the inverter 18, the first AND circuit 3, and the high-side driver 4 by switching the signal SKIP2 to High when the signal SKIP1 is at High.

Thereafter, when the zero-cross detection circuit 22 detects that the regeneration period of the inductor 9 is terminated and the zero-cross signal ZERO is switched from Low to High, the low-side MOSFET 21 is turned off via the NOR circuit 19 and the low-side driver 20 and the switch 25 and the switch 26 are turned off via the NAND circuit 24. Accordingly, since the supply of a bias to the oscillator 1 and the regulator circuit 5 is stopped, the circuit current decreases and it is thus possible to achieve improvement in efficiency.

Thereafter, when the charge of the output capacitor 10 is discharged by the output current Iout in the switching operation stop period of the intermittent oscillation (period where the turning-on of the high-side MOSFET 8 and the low-side MOSFET 21 is prohibited), the output voltage Vout slightly decreases. When the potential difference between the feedback voltage FB and the reference voltage Vref increases, the error amplification signal COMP1 increases and thus the error signal COMP2 also increases.

When the error signal COMP2 reaches the threshold value Vsk_Hi, the signal SKIP1 is switched from High to Low by the light-load detection comparator 23, the signal SKIP2 is also switched from High to Low, and the threshold value Vsk_Hi is switched to the threshold value Vsk_Md.

At this time, the signal BIAS_ON is switched from Low to High, so that a bias is supplied to the oscillator 1 and the regulator circuit 5 and the circuit operation is started. In addition, the output of the inverter 18 is switched from Low to High, so that the switching operation is restarted.

Thereafter, when the drain current IDH of the high-side MOSFET 8 increases and the current signal Vtrip reaches the error signal COMP2, the signal RESET of High is input to the SR flip-flop 2 from the PWM comparator 17 and thus the high-side MOSFET 8 is turned off. At this time, the signal RESET2 is supplied to the one-short circuit 275 via the third AND circuit 274.

In the one-short circuit 275, as illustrated in the timing chart of FIG. 6, the signal Ripple_ON is switched from Low to High for a predetermined period in response to the signal RESET2. Accordingly, since the switch 276 is turned on, the constant current Irippe is supplied to the inverted input terminal of the error amplifier 14 and the feedback voltage FB instantaneously increases. At this timing, the switch 2713 is turned on, the time constant of the filter circuit 271 decreases, and the attenuation effect is weakened.

When the feedback voltage FB rapidly increases, the voltage difference from the reference voltage Vref increases, the error amplification signal COMP1 instantaneously decreases, and the error signal COMP2 decreases accordingly.

When the error signal COMP2 decreases and reaches the threshold value Vsk_Md, the light-load detection comparator 23 switches the signal SKIP1 from Low to High again to stop the switching operation of the high-side MOSFET 8 and to switch the threshold value from Vsk_Md to Vsk_Hi.

When the signal Ripple_ON is switched from High to Low after a predetermined period elapses, the switch 276 and the switch 2713 are turned off. At this time, there is a possibility that overshoot occurs in the error amplification signal COMP1 and the light-load detection comparator 23 will cause erroneous detection, but the switch 2713 is turned off and thus the attenuation characteristics of the filter circuit 271 are enhanced. Accordingly, it is possible to prevent overshoot from occurring in the error signal COMP2.

When the charge of the output capacitor 10 is discharged by the output current Iout, the output voltage Vout slightly decreases, and the error signal COMP2 reaches the threshold value Vsk_Hi, the signal SKIP1 is switched from High to Low and the signal BIAS_ON is switched from Low to High. Accordingly, the switch 25 and the switch 26 are turned on and the operations of the oscillator 1 and the regulator circuit 5 are restarted, whereby the switching operations of the high-side MOSFET 8 and the low-side MOSFET 21 are restarted.

The intermittent oscillation operation is performed by repeating the above-mentioned series of operations, and the lower the output current Iout becomes, the longer the intermittent oscillation period is controlled to become. In the period where the turning-on of the high-side MOSFET 8 and the low-side MOSFET 21 is permitted in the intermittent oscillation control, the error signal COMP2 rapidly decreases by temporarily superimposing ripples on the feedback voltage FB at the end of the ON time of the high-side MOSFET 8. Accordingly, by preventing the high-side MOSFET 8 from continuously performing the switching operation, it is possible to suppress the number of switching operations per intermittent oscillation period to one time.

Accordingly, since the amount of energy accumulated in the inductor 9 is possible to be reduced, it is possible to prevent the intermittent oscillation frequency from being excessively lowered and to prevent ringing sound which is generated when a ceramic capacitor is used as the output capacitor 10 and an excessive increase of the output voltage ripples.

The operation in a second control period (No_Load<Iout<<Iskip_in) of the intermittent oscillation with a light load will be described below.

The peak current IDH of the high-side MOSFET 8 in the intermittent oscillation operation is determined by comparing the current signal Vtrip with the error signal COMP2 at the timing at which the error signal COMP2 reaches the threshold value Vsk_Hi and the switching operation is restarted. That is, the peak current IDH of the high-side MOSFET 8 has a fixed value based on the threshold value Vsk_Hi.

Here, the switching frequency Fskip in the intermittent oscillation operation is expressed by the following expression, where L is the inductance of the inductor 9.

$$Fskip=\{2\times Iout\times Vout\times(Vin-Vout)\}/(L\times IDH^2\times Vin)$$

In the switching power-supply device illustrated in FIG. 1, the switching frequency Fskip is controlled so as not to be equal to or less than the upper limit (16 kHz) of the human audible frequency band by the function of the lower frequency limiter 28.

The lower frequency limiter 28 rapidly charges the capacitor 282 by turning on the switch 281 in the period where the drive signal HSon is at High, and discharges the capacitor 282 with the constant current Iflim by turning on the switch 283 when the drive signal HSon is switched to Low and the signal SKIP1 is switched to High. When the potential of the capacitor 282 reaches the reference voltage Vflim, the output signal Flim of the comparator 284 is switched to Low and the signal SKIP1b output from the AND circuit 285 is switched to Low. Accordingly, the signal SKIP2 is switched to Low and the switching operation is forcibly restarted.

Figure 7:
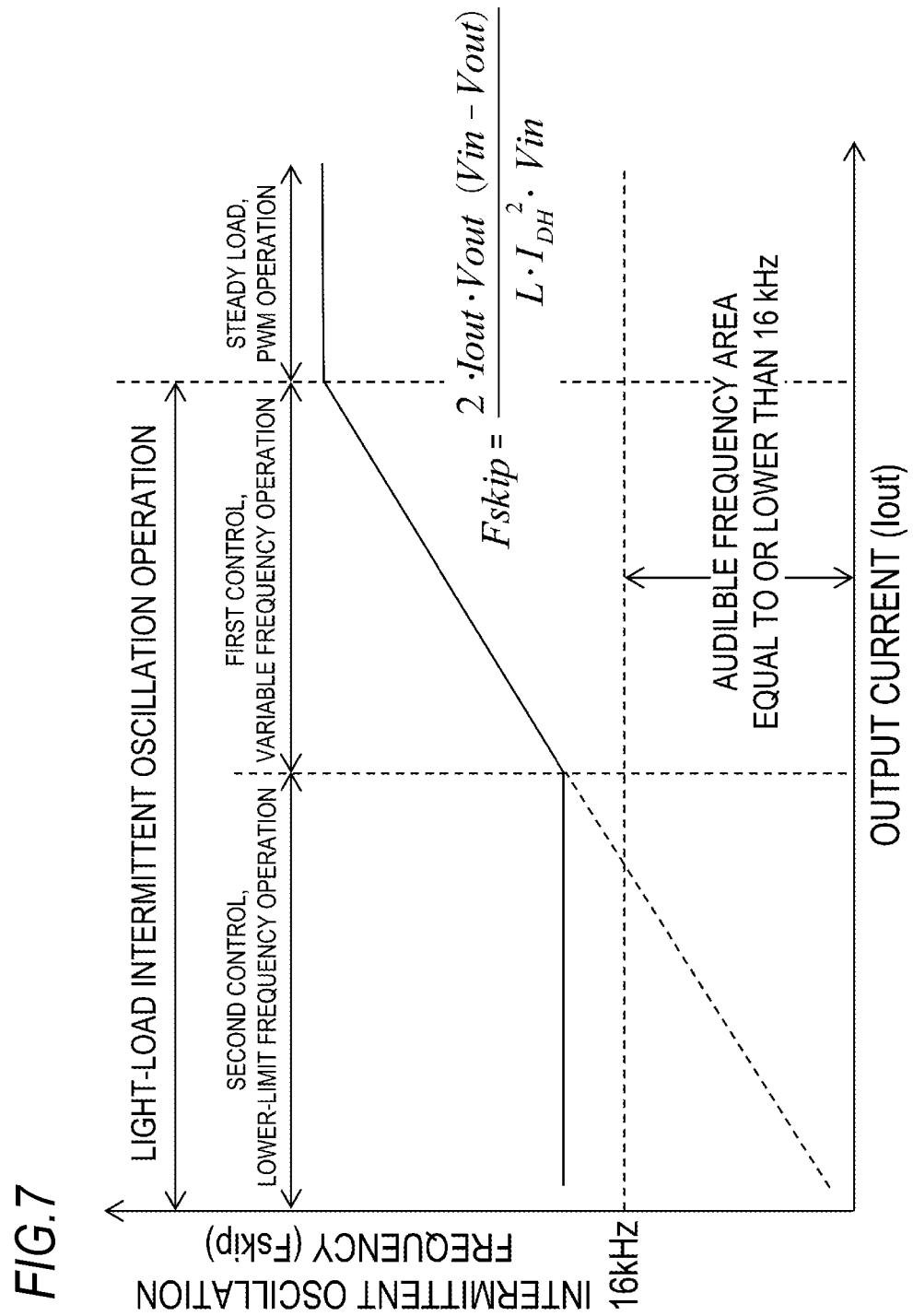
FIG. 7 is a diagram illustrating effects of the switching power-supply device illustrated in FIG. 1.

By the restarting of the switching operation, excessive energy is supplied to the inductor 9 and the output voltage Vout slightly increases, but the error signal COMp2 is controlled to decrease by the feedback control. By comparing the error signal COMP2 with the current signal Vtrip, the peak current IDH of the high-side MOSFET 8 is controlled so as to be lower than that in the first control period. By this series of operations, even when the output current Iout decreases as illustrated in FIG. 7, it is possible to perform the intermittent oscillation control with a switching frequency higher than the upper limit of the audible frequency band.

Finally, the operation of returning from the light load state to the steady load state (Iout≥Iskip_out) will be described below.

Since the period where the output voltage Vout decreases in the Off period of the switching element in the intermittent oscillation control with the increase in the output current Iout, the switching period in the intermittent oscillation control is shortened. Then, when the operation mode transitions to the continuity mode in which the valley current of the inductor current IL is equal to or greater than 0 A, the zero-cross signal ZERO is fixed to Low and thus the SR flip-flop 2722 is in the reset state.

Accordingly, the switch 2725 is turned on, the switch 2723 is turned off, and the charging of the capacitor 2726 is started. When the potential of the capacitor 2726 reaches the threshold value Vtm_Hi, the comparator 2727 is inverted to switch the signal SKIP-OK from High to Low and to switch the threshold value from Vtm_Hi to Vsk_Lo, and the light-load operation is returned to the normal operation.

Figure 8:
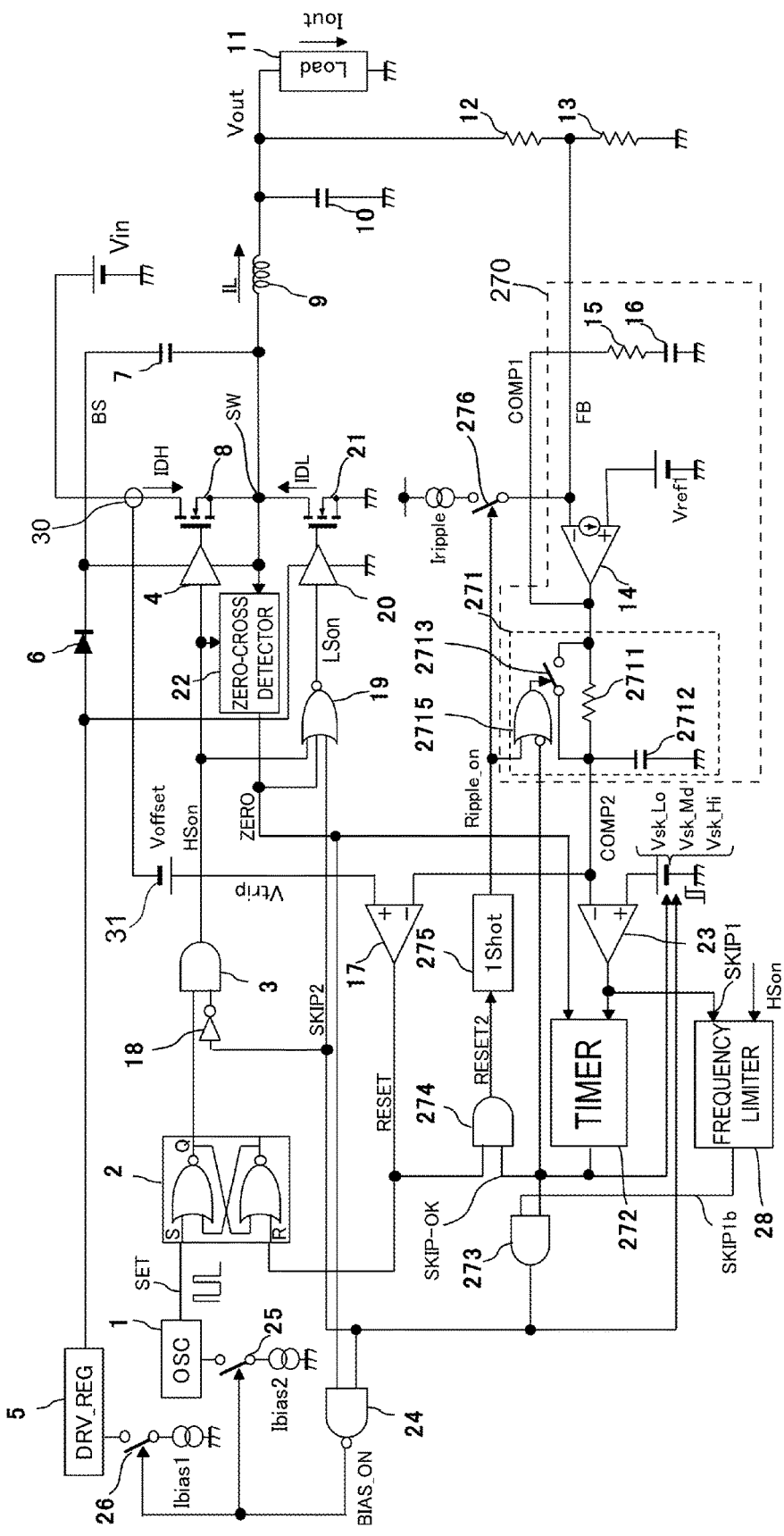
FIG. 8 is a diagram illustrating a first modification example of the switching power-supply device illustrated in FIG. 1.

FIG. 8 is a diagram illustrating a first modification example of the switching power-supply device illustrated in FIG. 1. The circuit configuration of the switching power-supply device illustrated in FIG. 8 is the same as the switching power-supply device illustrated in FIG. 1, except that an offset circuit 31 that adds an offset Voffset to the current signal Vtrip is disposed between the output terminal of the current detection circuit 30 and the plus input terminal of the PWM comparator 17. The operation of the switching power-supply device illustrated in FIG. 8 is different from the operation of the switching power-supply device illustrated in FIG. 1, in that third control of the intermittent oscillation is added.

In the switching power-supply device illustrated in FIG. 1, the PWM comparator 17 controls the ON width of the high-side MOSFET 8 by comparing the error signal COMP2 with the current signal Vtrip to which the offset Voffset is added.

In the second control, the ON width of the high-side MOSFET 8 reaches the minimum ON width which is determined by propagation delay of the circuit or the like, the ON width of the high-side MOSFET 8 is not possible to be reduced anymore and thus the output voltage Vout slightly increases.

In the switching power-supply device illustrated in FIG. 8, the variation in the output voltage Vout in an ultra-light load state where the output current Iout is very small is suppressed to improve load regulation.

Figure 9:
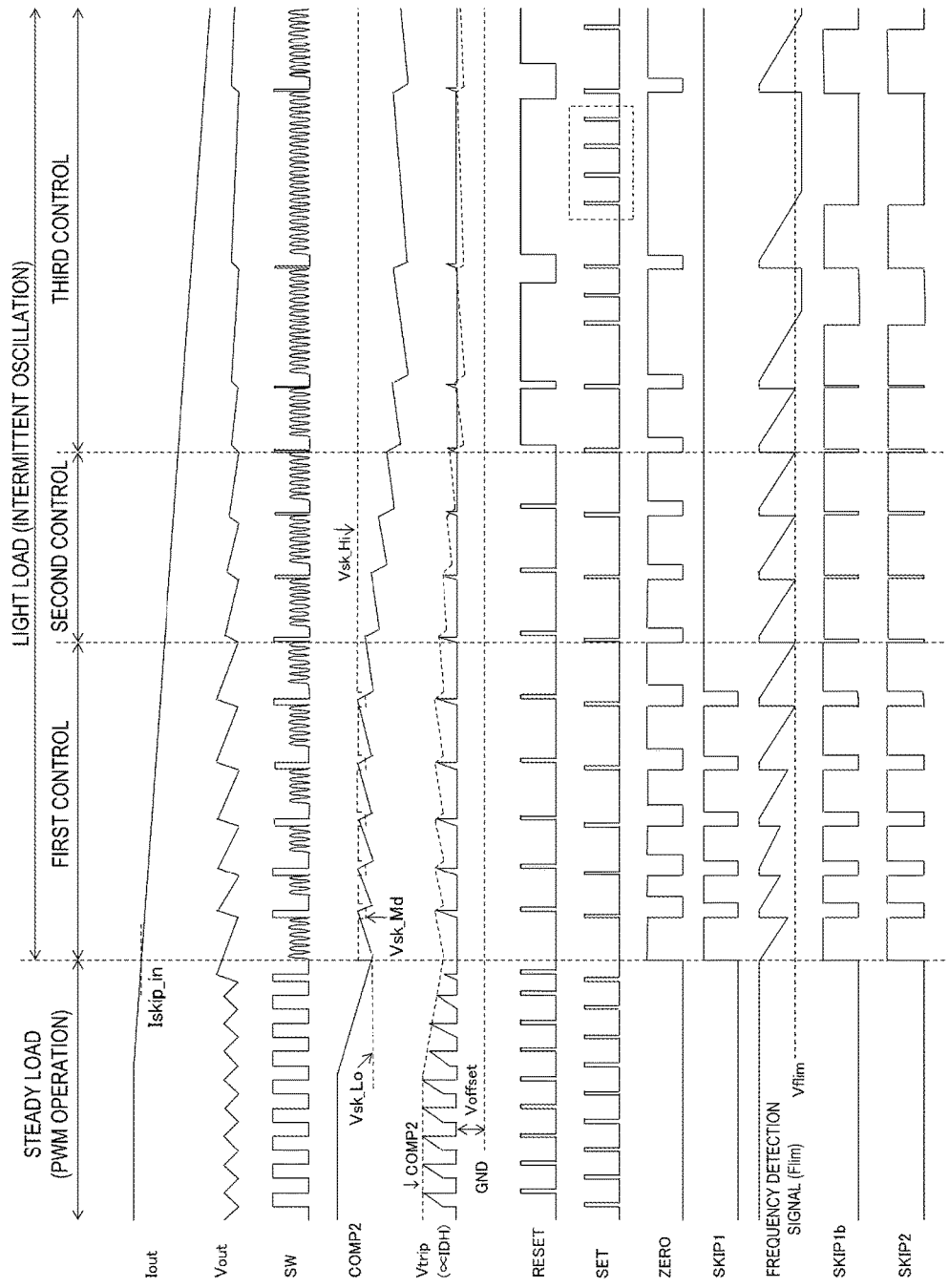
FIG. 9 is a timing chart illustrating the operation of the switching power-supply device illustrated in FIG. 8.

The first control operation and the second control operation of the switching power-supply device illustrated in FIG. 8 are the same as those in the switching power-supply device illustrated in FIG. 1 and description thereof will not be repeated. Now, the operation in the third control state (Iout≈No_Load) of the intermittent oscillation with a light load will be described with reference to FIGS. 9 to 11.

In the second control state of the intermittent oscillation, by controlling the ON width of the high-side MOSFET 8 depending on the output current Iout such that the intermittent oscillation frequency becomes higher than the upper limit of the audible frequency band, the peak current IDH of the high-side MOSFET 8 is controlled. In the second control state, when the ON width of the high-side MOSFET 8 reaches the minimum ON width which is determined by propagation delay of the circuit or the like, the output voltage Vout slightly increases and the control state is switched to the third control of the intermittent oscillation.

In the third control, feedback control is performed so as to retain the output voltage Vout at a constant value and the error amplifier 14 further decreases the error amplification signal COMM. When the error signal COMP2 becomes equal to or less than the offset Voffset with the decrease in the error amplification signal COMP1, the PWM comparator 17 switches the signal RESET input to the SR flip-flop 2 to High. Accordingly, the SR flip-flop 2 is not in the set state and disturbs the turning-on of the high-side MOSFET 8.

Thereafter, when the error signal COMP2 is greater than the offset Voffset, the setting of the SR flip-flop 2 is permitted and thus the high-side MOSFET 8 is turned on. By controlling the OFF period where the turning-on of the high-side MOSFET 8 is prohibited by this repetition, it is possible to keep the output voltage Vout constant even in the ultra-light load area close to no load (see FIG. 11).

Figure 10:
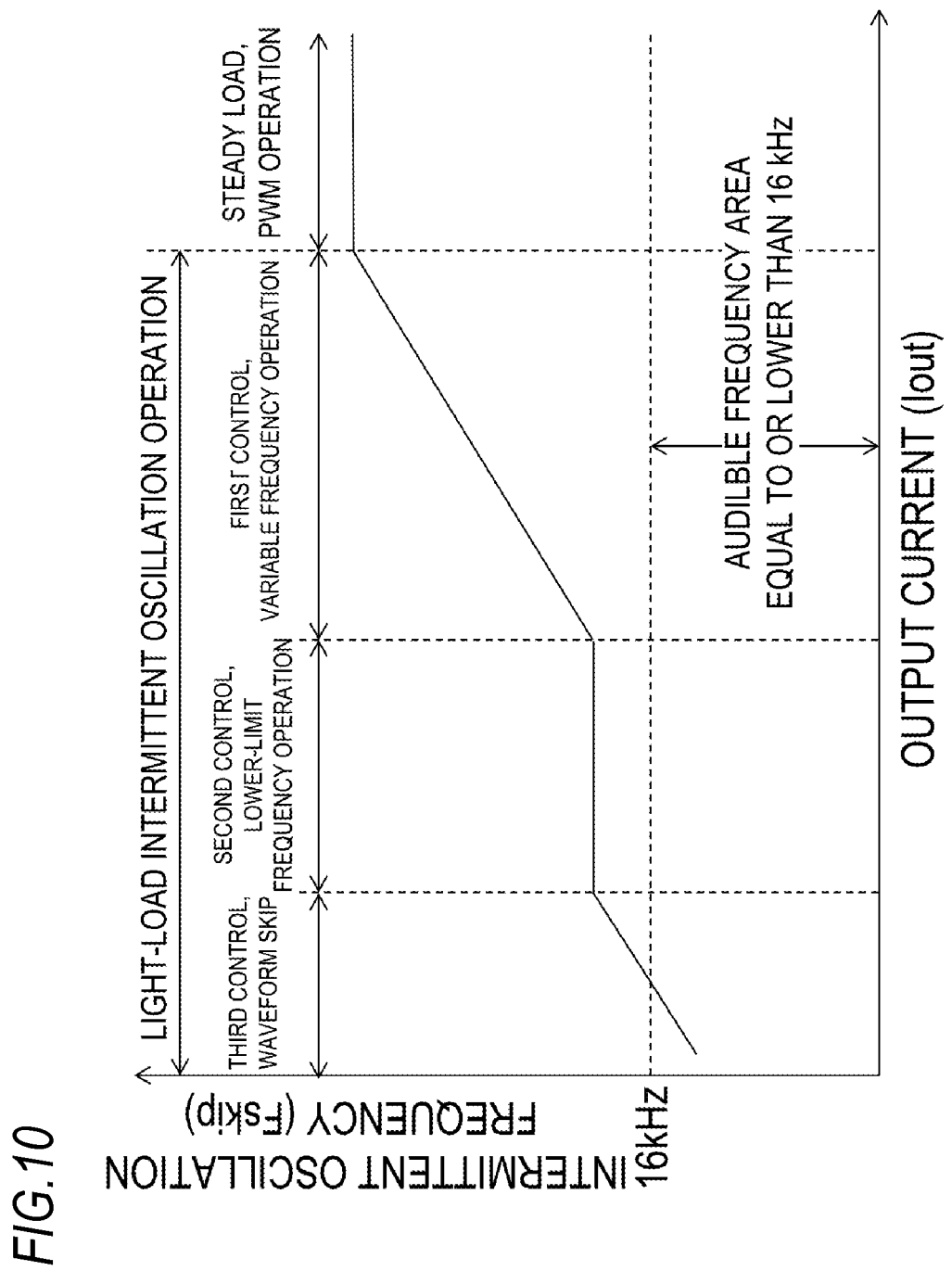
FIG. 10 is a diagram illustrating effects of the switching power-supply device illustrated in FIG. 8.
Figure 11:
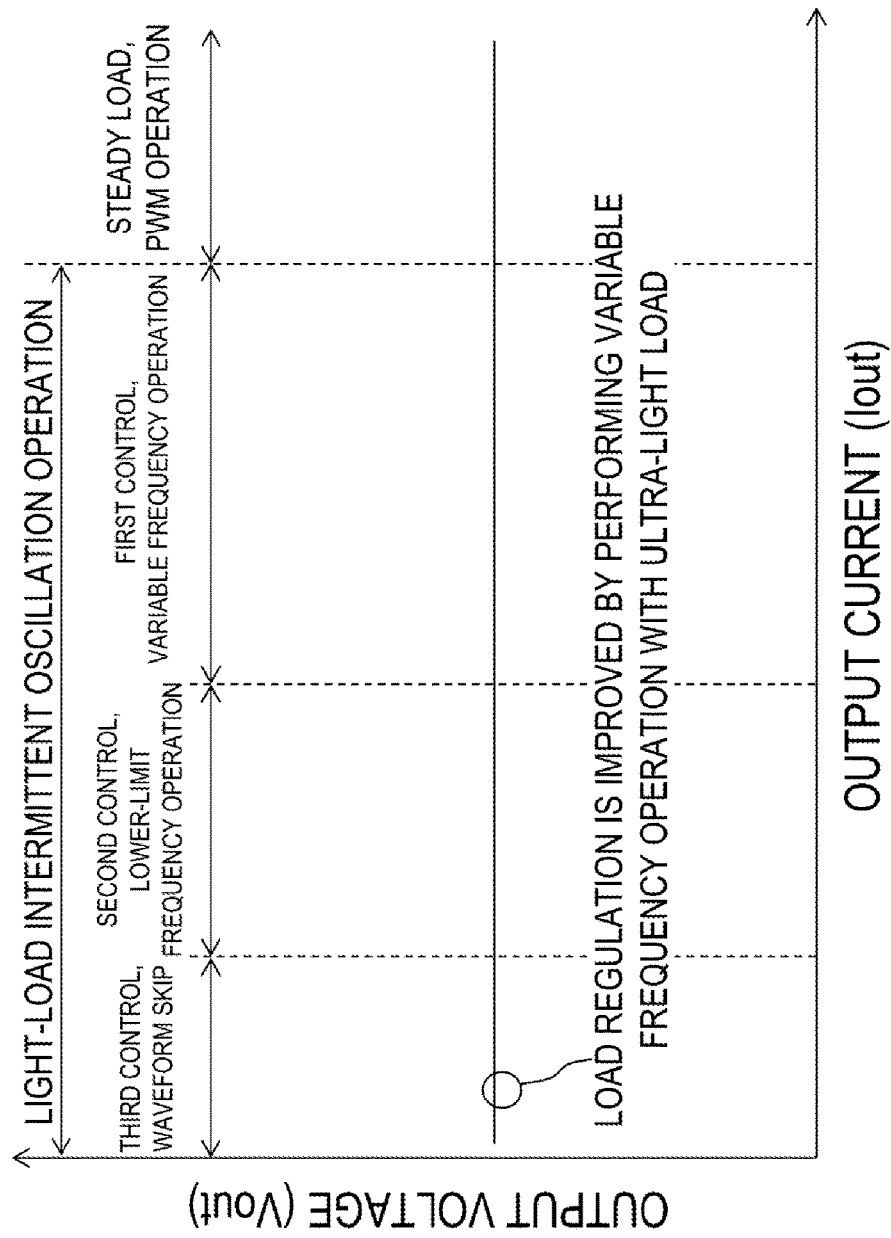
FIG. 11 is a diagram illustrating effects of the switching power-supply device illustrated in FIG. 8.

In the third control, as illustrated in FIG. 10, the switching frequency belongs to the audible frequency band. However, since the peak current IDH of the high-side MOSFET 8 is suppressed to be low, the output ripple voltage is low. Accordingly, the inverse piezoelectric effect of the ceramic capacitor is relaxed and the ringing sound is suppressed to a non-bothering level.

Figure 12:
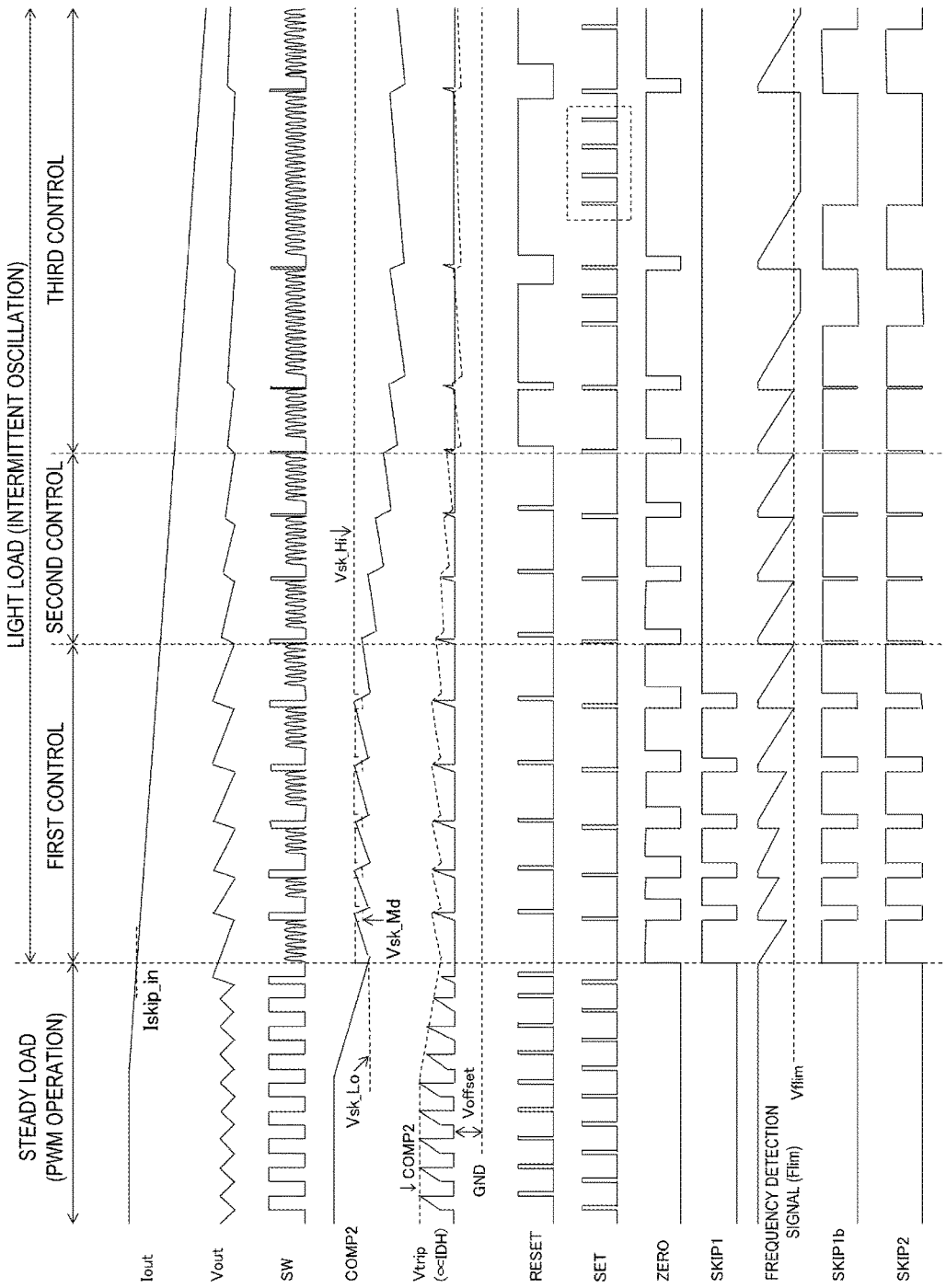
FIG. 12 is a diagram illustrating a second modification example of the switching power-supply device illustrated in FIG. 1.

FIG. 12 is a diagram illustrating a second modification example of the switching power-supply device illustrated in FIG. 1. The switching power-supply device illustrated in FIG. 12 has the same configuration as the switching power-supply device illustrated in FIG. 1, except that an ultra-light load detection circuit 29 is added. The operation of the switching power-supply device illustrated in FIG. 12 is different from the operation of the switching power-supply device illustrated in FIG. 1, in that a third control state of the intermittent oscillation is added.

The ultra-light load detection circuit 29 includes an ultra-light load detection comparator 291 in which the error signal COMP2 is input to a plus input terminal thereof and a threshold voltage Vextremly_Lo is input to a minus input terminal and an AND circuit 292 to which a SET prohibition signal output from the ultra-light load detection comparator 291 and the pulse signal SET generated from the oscillator 1 are input. The output signal of the AND circuit 292 is input to the set terminal S of the SR flip-flop 2.

Figure 13:
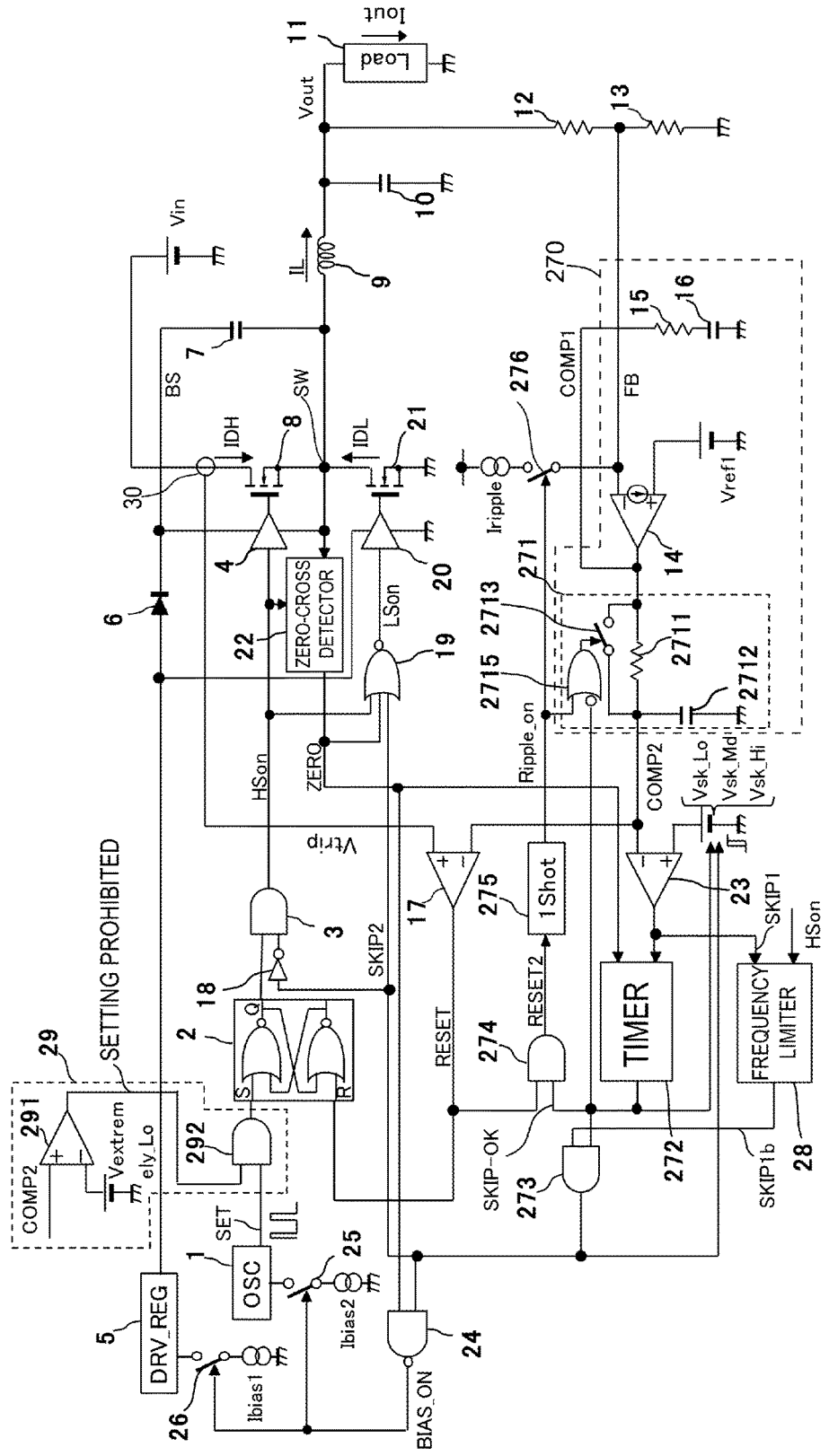
FIG. 13 is a timing chart illustrating the operation of the switching power-supply device illustrated in FIG. 12.

The operation in the third control state (Iout≈No_Load) of the intermittent oscillation with a light load in the switching power-supply device illustrated in FIG. 12 will be described below with reference to FIG. 13.

In the second control of the intermittent oscillation, by controlling the ON width of the high-side MOSFET 8 depending on the output current Iout such that the intermittent oscillation frequency becomes higher than the upper limit of the audible frequency band, the peak current IDH of the high-side MOSFET 8 is controlled.

In the second control state, when the ON width of the high-side MOSFET 8 reaches the minimum ON width which is determined by propagation delay of the circuit or the like, the output voltage Vout slightly increases and the control state is switched to the third control of the intermittent oscillation.

At this time, the feedback control is performed so as to retain the output voltage Vout at a constant value and the error amplifier 14 further decreases the error amplification signal COMP1. When the error signal COMP2 becomes equal to or less than the threshold voltage Vextremly_Lo with the decrease in the error amplification signal COMP1, the output of the ultra-light load detection comparator 291 is switched to Low and thus the SR flip-flop 2 is prevented from being switched to the set state by the AND circuit 292. Accordingly, the turning-on operation of the high-side MOSFET 8 is prohibited.

Thereafter, when the error signal COMP2 is greater than the threshold voltage Vextremly_Lo, the setting of the SR flip-flop 2 is permitted and thus the high-side MOSFET 8 is turned on. By controlling the OFF period by this repetition, it is possible to keep the output voltage Vout constant even in the ultra-light load area close to no load.

In the third control, the switching frequency belongs to the audible frequency band. However, since the peak current IDH of the high-side MOSFET 8 is suppressed to be low, the output ripple voltage is low. Accordingly, the inverse piezoelectric effect of the ceramic capacitor is relaxed and the ringing sound is suppressed to a non-bothering level.

It should be understood that the above-mentioned embodiments are exemplary in all the viewpoints and are not restrictive. The scope of the invention is not defined by the above description but by the appended claims, and includes all modifications without departing from the equivalent concept and scope of the claims.

For example, the switching power-supply device illustrated in FIG. 1 converts voltages by using the high-side MOSFET 8 and the low-side MOSFET 21, but the invention is possible to be applied to a switching power-supply device that converts voltages by controlling switching of one MOSFET in the same way.

As described above, the following configurations are disclosed in this specification.

The disclosed switching power-supply device is a switching power-supply device that converts a first DC voltage supplied from an input power source into a second DC voltage and outputs the second DC voltage by turning on-and-off a switching element connected between the input power source and an inductor, comprising: a drive unit, which drives the switching element based on a drive signal; a control unit, which performs intermittent oscillation control of alternately repeating a period where the turning-on of the switching element by the drive unit is prohibited and a period where the turning-on of the switching element by the drive unit is permitted; and an error signal generator, which generates an error signal based on an error between a voltage corresponding to the second DC voltage and a reference voltage, wherein the control unit controls a timing, at which the turning-on of the switching element is permitted in the intermittent oscillation control, based on a signal indicating a comparison result between the error signal and a threshold value and an OFF time of the switching element based on the drive signal.

In the disclosed switching power-supply device, in a case where the OFF time of the switching element based on the drive signal becomes a predetermined time threshold value and where the error signal is less than the threshold value in the intermittent oscillation control, the control unit may permit the turning-on of the switching element.

In the disclosed switching power-supply device, the control unit may the control unit includes: a capacitor, which is charged in a supply period of an ON signal, which is included in the drive signal, for turning on the switching element and which is discharged by a current source in a state where the error signal is less than the threshold value; and a comparator, which compares the voltage of the capacitor with a discharge reference voltage, wherein the control unit permits the turning-on of the switching element in a period where the voltage of the capacitor is discharged by the current source and is equal to or lower than the discharge reference voltage, and wherein a time required to discharge the voltage of the capacitor charged in the supply period of the ON signal to become the discharge reference voltage by the current source is set to the time threshold value.

In the disclosed switching power-supply device, the time threshold value may be set to a value at which a lowest switching frequency of the switching element in the intermittent oscillation control is higher than 16 kHz.

The disclosed switching power-supply device may further include
an oscillator, which generates the drive signal; a regulator circuit, which drives the drive unit; a zero-cross detection circuit, which detects whether a regeneration period of the inductor has terminated; and
a drive stopping unit, which stops at least one of the oscillator and the regulator circuit in a period where the turning-on of the switching element is prohibited in the intermittent oscillation control and where it is detected that the regeneration period of the inductor has detected by the zero-cross detection circuit.

The disclosed switching power-supply device may further include: a current detection circuit, which detects a current flowing in the switching element and outputs a detected current signal; an offset circuit, which adds an offset to the current signal output from the current detection circuit; and a drive signal generator, which generates the drive signal of the switching element based on the pulse signal supplied from the oscillator and a comparison output between the output signal of the offset circuit and the error signal, wherein when the error signal is equal to or less than the offset, the drive signal generating unit stops generating of the drive signal for turning on the switching element.

The disclosed switching power-supply device may further include: a current detection circuit, which detects a current flowing in the switching element and outputs a detected current signal; and a drive signal generator, which generates the drive signal of the switching element based on the pulse signal supplied from the oscillator and a comparison output between the current signal and the error signal, wherein when the error signal is equal to or less than a second threshold value, the drive signal generating unit stops generating of the drive signal for turning on the switching element.

In the disclosed switching power-supply device, the error signal generating unit may include an error amplifier, which amplifies an error between the voltage corresponding to the second DC voltage and a reference voltage and outputs an error amplification signal; and a filter circuit, which attenuates the error amplification signal with a variable time constant and outputs the error signal, and wherein the switching power-supply device further comprises: a current detection circuit, which detects a current flowing in the switching element and outputs a detected current signal; a drive signal generator, which generates the drive signal of the switching element based on the pulse signal supplied from the oscillator and a comparison output between the current signal and the error signal; and a voltage superimposing circuit, which superimposes a voltage signal on an input terminal of the error amplifier for a predetermined time, when a signal for switching the ON state of the switching element to the OFF state is generated by the drive signal generating unit in a state where the control unit performs the intermittent oscillation control.

In the disclosed switching power-supply device, the filter circuit may set a time constant of the filter circuit in a period, where the voltage signal is superimposed on the input terminal of the error amplifier, to be less than a time constant of the filter circuit in a period other than said period.

The disclosed switching power-supply device may further include: a comparator, which compares the error signal with a threshold value and outputs a signal indicating the comparison result; a zero-cross detection circuit, which detects whether a regeneration period of the inductor has terminated; and a timer circuit, wherein when a signal indicating that the regeneration period of the inductor has terminated is output from the zero-cross detection circuit and a signal indicating that the error signal is less than the threshold value is output from the comparator, the timer circuit permits the intermittent oscillation control by the control unit after a first predetermined time elapses, and wherein when a time in which the signal indicating that the regeneration period of the inductor has terminated is not output from the zero-cross detection circuit reaches a second predetermined time, the timer circuit prohibits the intermittent oscillation control by the control unit.

What is claimed is:
1. A switching power-supply device that converts a first DC voltage supplied from an input power source into a second DC voltage and outputs the second DC voltage by turning on-and-off a switching element connected between the input power source and an inductor, comprising:
   a drive unit, which drives the switching element based on a drive signal;
   a control unit, which performs intermittent oscillation control of alternately repeating a period where the turning-on of the switching element by the drive unit is prohibited and a period where the turning-on of the switching element by the drive unit is permitted; and
   an error signal generator, which generates an error signal based on an error between a voltage corresponding to the second DC voltage and a reference voltage,
   wherein the control unit controls a timing, at which the turning-on of the switching element is permitted in the intermittent oscillation control, based on a signal indicating a comparison result between the error signal and a threshold value and an OFF time of the switching element based on the drive signal,
   wherein in a case where the OFF time of the switching element based on the drive signal becomes a predeter- mined time threshold value in the intermittent oscillation control, the control unit permits the turning-on of the switching element, and wherein the predetermined time threshold value is set to a value at which a lowest switching frequency of the switching element in the intermittent oscillation control is higher than a predetermined lower frequency limit.

2. The switching power-supply device according to claim 1, wherein the control unit includes:
- a capacitor, which is charged in a supply period of an ON signal, which is included in the drive signal, for turning on the switching element and which is discharged by a current source in a state where the error signal is less than the threshold value; and
- a comparator, which compares the voltage of the capacitor with a discharge reference voltage, wherein the control unit permits the turning-on of the switching element in a period where the voltage of the capacitor is discharged by the current source and is equal to or lower than the discharge reference voltage, and wherein a time required to discharge the voltage of the capacitor charged in the supply period of the ON signal to become the discharge reference voltage by the current source is set to the predetermined time threshold value.

3. The switching power-supply device according to claim 1, further comprising:
- an oscillator, which generates a pulse signal;
- a regulator circuit, which drives the drive unit;
- a zero-cross detection circuit, which detects whether a regeneration period of the inductor has terminated; and
- a drive stopping unit, which stops at least one of the oscillator and the regulator circuit in a period in which the turning-on of the switching element is prohibited in the intermittent oscillation control and in which the zero-cross detection circuit detects that the regeneration period of the inductor has terminated.

4. The switching power-supply device according to claim 3, further comprising:
- a current detection circuit, which detects a current flowing in the switching element and outputs a current signal;
- an offset circuit, which adds an offset to the current signal output from the current detection circuit; and
- a drive signal generator, which generates the drive signal of the switching element based on the pulse signal supplied from the oscillator and a comparison output between the offset current signal of the offset circuit and the error signal, wherein when the error signal is equal to or less than the offset, the drive signal generating unit stops generating the drive signal for turning on the switching element.

5. The switching power-supply device according to claim 3, further comprising:
- a current detection circuit, which detects a current flowing in the switching element and outputs a current signal; and
- a drive signal generator, which generates the drive signal of the switching element based on the pulse signal supplied from the oscillator and a comparison output between the current signal and the error signal, wherein when the error signal is equal to or less than a second threshold value, the drive signal generating unit stops generating of the drive signal for turning on the switching element.

6. The switching power-supply device according to claim 3, wherein the error signal generating unit includes:
- an error amplifier, which amplifies an error between the voltage corresponding to the second DC voltage and a reference voltage and outputs an error amplification signal; and
- a filter circuit, which attenuates the error amplification signal with a variable time constant and outputs the error signal, and wherein the switching power-supply device further comprises:
- a current detection circuit, which detects a current flowing in the switching element and outputs a current signal;
- a drive signal generator, which generates the drive signal of the switching element based on the pulse signal supplied from the oscillator and a comparison output between the current signal and the error signal; and
- a voltage superimposing circuit, which superimposes a voltage signal on an input terminal of the error amplifier for a predetermined time, when a signal for switching an ON state of the switching element to an OFF state is generated by the drive signal generating unit in a state where the control unit performs the intermittent oscillation control.

7. A switching power-supply device that converts a first DC voltage supplied from an input power source into a second DC voltage and outputs the second DC voltage by turning on-and-off a switching element connected between the input power source and an inductor, comprising:
- a drive unit, which drives the switching element based on a drive signal;
- a control unit, which performs intermittent oscillation control of alternately repeating a period where the turning-on of the switching element by the drive unit is prohibited and a period where the turning-on of the switching element by the drive unit is permitted; and
- an error signal generator, which generates an error signal based on an error between a voltage corresponding to the second DC voltage and a reference voltage, wherein the control unit controls a timing, at which the turning-on of the switching element is permitted in the intermittent oscillation control, based on a signal indicating a comparison result between the error signal and a threshold value and an OFF time of the switching element based on the drive signal, wherein the error signal generating unit includes:
- an error amplifier, which amplifies an error between the voltage corresponding to the second DC voltage and a reference voltage and outputs an error amplification signal; and
- a filter circuit, which attenuates the error amplification signal with a variable time constant and outputs the error signal, wherein the switching power-supply device further comprises:
- a current detection circuit, which detects a current flowing in the switching element and outputs a current signal;
- an oscillator, which generates a pulse signal;
- a drive signal generator, which generates the drive signal of the switching element based on the pulse signal supplied from the oscillator and a comparison output between the current signal and the error signal; and a voltage superimposing circuit, which superimposes a voltage signal on an input terminal of the error amplifier for a predetermined time, when a signal for switching an ON state of the switching element to an OFF state is generated by the drive signal generating unit in a state where the control unit performs the intermittent oscillation control, and wherein the filter circuit sets a time constant of the filter circuit in a period, where the voltage signal is superimposed on the input terminal of the error amplifier, to be less than the time constant of the filter circuit in a period other than said period.

8. The switching power-supply device according to claim 7, further comprising:

a comparator, which compares the error signal with a threshold value and outputs a signal indicating the comparison result;

a zero-cross detection circuit, which detects whether a regeneration period of the inductor has terminated; and a timer circuit, wherein when a signal indicating that the regeneration period of the inductor has terminated is output from the zero-cross detection circuit and a signal indicating that the error signal is less than the threshold value is output from the comparator, the timer circuit permits the intermittent oscillation control by the control unit after a first predetermined time elapses, and wherein when a time in which the signal indicating that the regeneration period of the inductor has terminated is not output from the zero-cross detection circuit reaches a second predetermined time, the timer circuit prohibits the intermittent oscillation control by the control unit.

* * * * *